Patented Nov. 18, 1941

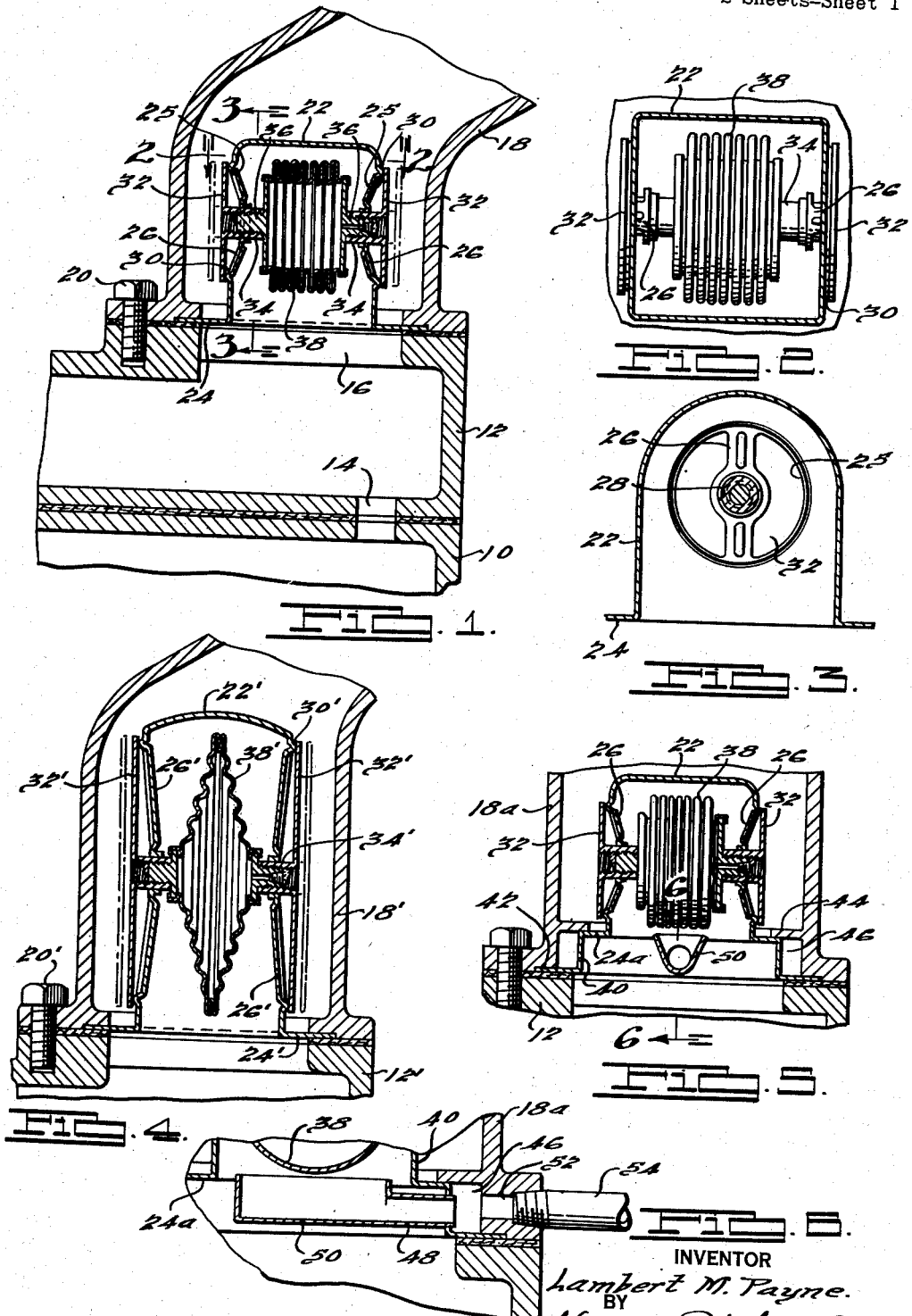

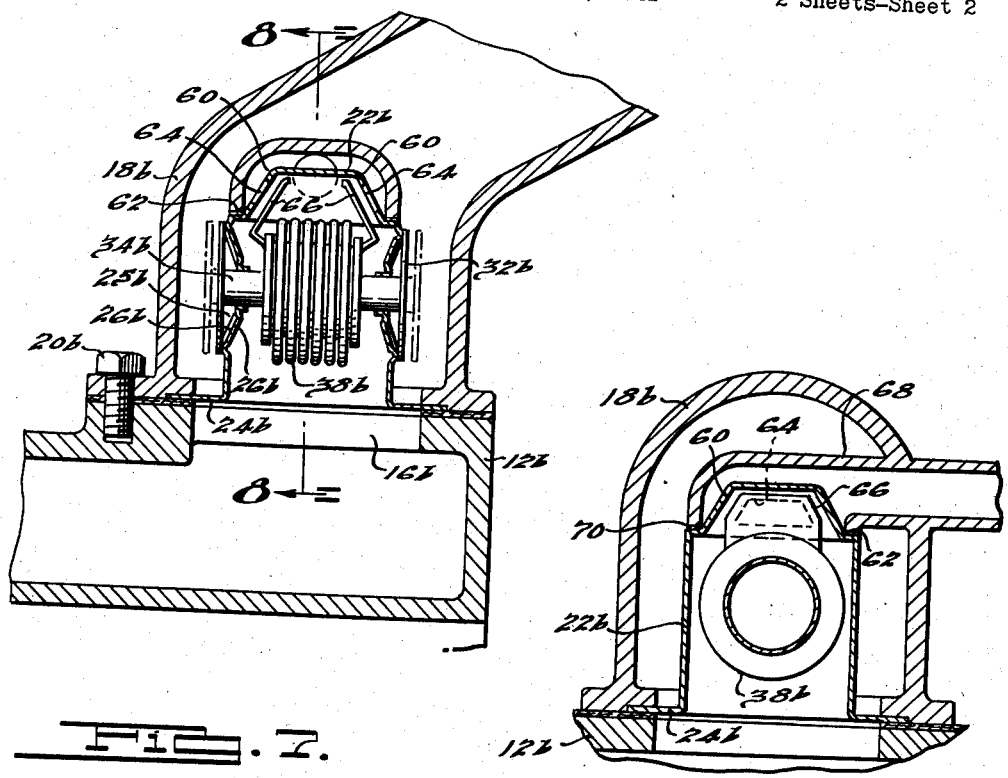
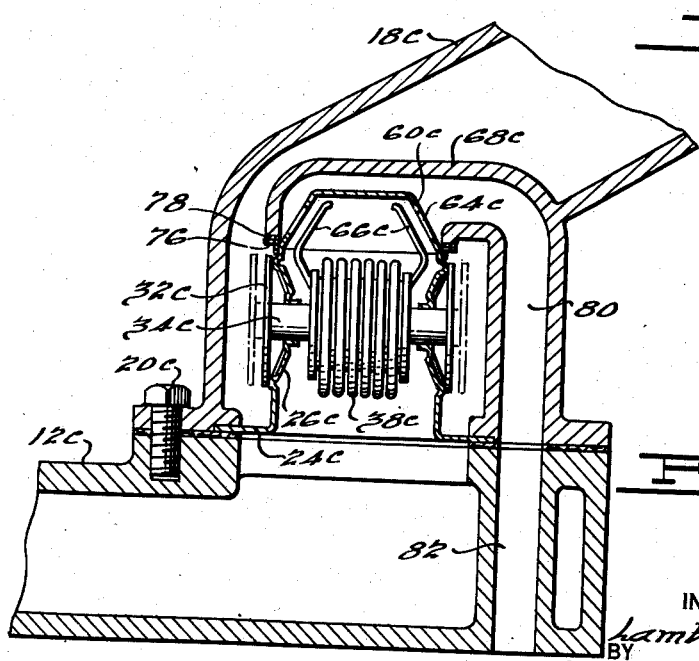

2,263,100

UNITED STATES PATENT OFFICE 2,263,100

THERMOSTAT CONSTRUCTION

Lambert M. Payne, Detroit, Mich., assignor to L. M. Payne Company, Detroit, Mich., a corporation of Michigan Application March 6, 1941, Serial No. 382,023

12 Claims. (Cl. 236—34)

This invention relates to a thermostat structure and particularly to one designed for use in connection with the cooling systems of internal combustion engines employed to drive motor vehicles or the like, the principal object being the provision of a structure of this type having improved operating characteristics, that will be economical to manufacture and that will occupy a minimum of space.

Other objects of the invention include a thermostat structure adapted to be interposed in the water circulating system of an internal combustion engine and including a housing interposed in the path of flow of the water, the housing being provided with a pair of ports disposed on opposite sides of the housing and each port being provided with a cooperating valve, the valves being connected by a bellows type thermostat operable under the influence of temperature changes in the water to cause said valves to move relative to one another and to said ports; the provision of a construction as above described in which the valve and the bellows constitute a unit mounted for floating movement in the housing; the provision of a construction of the type described in which the thermostatic element is affected to a minimum extent by variations in pressure in the cooling system of the associated engine; the provision of a thermostat structure for use in the liquid cooling system of an internal combustion engine including a housing interposed in the path of flow of the liquid and provided with a pair of ports therein, a poppet type of valve associated with each of the ports, and a hollow thermostatic element containing a vaporizable fluid interposed between and secured to the valves for controlling the relation of the valves to the ports during variations of temperature in the cooling fluid; and the provision of a thermostat structure of the type described that is simple in construction, efficient in operation and economical to manufacture.

Other objects of the invention include the provision of a thermostat structure for use in conjunction with the liquid cooling system of an internal combustion engine and including a housing interposed in the path of flow of the fluid and provided with a pair of opposed flow ports, valves cooperating with each of said ports and a thermostatic element interconnected between the valves and adapted to move said valves toward and away from each other upon variation in temperature of the fluid to control the flow of fluid through said ports, together with a novel form of means for by-passing fluid through the thermostat construction during such times as the fluid remains below a predetermined desired temperature; the provision of a construction as above described in which the by-pass means includes a constantly open passage disposed in the path of fluid flowing through the housing; and the provision of a construction as above described in which means movable with the valves are provided in association therewith and serve as valves for positively controlling by-pass ports in the housing.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary, vertical sectional view taken centrally through the outlet passage of an internal combustion engine at its point of connection to the cylinder head thereof and illustrating a thermostat structure including features of the present invention operatively associated therewith;

Fig. 2 is an enlarged fragmentary, horizontal sectional view taken on the line 2—2 of Fig. 1;

Fig. 3 is an enlarged vertical sectional view taken on the line 3—3 of Fig. 1;

Fig. 4 is a view similar to Fig. 1 but illustrating a modified form of construction employing a slightly different type of thermostatic element;

Fig. 5 is a view similar to Fig. 1 but illustrating a modification thereof to provide for by-passing the flow of water when the main flow of water through the thermostat structure to the radiator is prevented;

Fig. 6 is an enlarged, fragmentary, transverse sectional view taken on the line 6—6 of Fig. 5;

Fig. 7 is a view similar to Fig. 1 but illustrating a modified form of by-pass construction incorporated therewith;

Fig. 8 is a vertical sectional view taken on the line 8—8 of Fig. 7; and,

Fig. 9 is a view similar to Fig. 7 but illustrating a slightly modified form of by-pass construction.

Conventional forms of thermostat structures for controlling the flow of cooling fluid in internal combustion engine cooling systems conventionally include a housing having a single main flow port provided with a cooperating valve and including a thermostatic element for controlling the position of the valve in accordance with the temperature of the cooling fluid. Some types of structures include butterfly valves operated by bi-metallic thermostatic elements and others include poppet type valves controlled by a metal bellows type of thermostat. In both of these types wherein a single valve is employed to control the main flow of fluid through the circulating system the valve and the thermostatic element must be of such size, in order to accomplish their intended results in a satisfactory manner, that their bulk is considered undesirably large and for this reason renders their adaptation to certain types of and/or makes of engines difficult.

It has heretofore been suggested that such thermostat constructions be provided with a pair of rigidly interconnected valves of smaller diameters cooperating with correspondingly smaller ports in the associated housing and actuated by a bi-metallic type of thermostat, but this heretofore suggested construction includes certain disadvantages and fails to overcome some of the more outstanding disadvantages of the conventional type of construction.

One difficulty which has arisen in connection with conventional form of thermostat has been caused by the use of so-called pressure caps on the cooling systems of automobiles which caps serve to build up a positive pressure in the engine cooling system and which pressure is of advantage for well known reasons. However, with conventional types of thermostats it has been found that where such pressure builds up in an engine cooling system it requires a higher temperature of the cooling fluid to open the conventional type of thermostat than when said pressure is lacking, thus resulting in certain disadvantages.

The present invention utilizes a construction in which the housing of the thermostat is provided with a pair of opposed main flow ports together with a valve associated with each of the ports to control the flow of fluid therethrough, the valves being connected together by a thermostat of the vaporizable liquid type so that upon expansion and contraction of the same the valves will be caused to move away from and toward each other respectively. By using two valves and a thermostat interposed between them in the manner described I am enabled to employ valves of smaller diameters to obtain the required flow through the thermostat structure and am also enabled to employ a thermostatic element of materially smaller size than that required in conventional constructions. The result is that I am able to provide a satisfactory structure of materially smaller size than conventional constructions designed to handle the same volume of flow of fluid therethrough, and I am enabled to produce such thermostat structure for less money than an equivalent thermostat structure of conventional form. This improved thermostat structure is affected to a materially smaller degree by positive pressure set up in the associated cooling system than thermostat structures of conventional construction employing liquid filled elements.

Referring now to the accompanying drawings and particularly to the construction illustrated in Figs. 1, 2 and 3, the water jacket for the cylinders of an internal combustion engine is indicated at 10 and as being provided with a conventional water jacketed cylinder head 12 thereon. Passages such as 14 connect the water jacket for the cylinder block with the water jacket for the cylinder head and the cylinder head is provided with a discharge passage 16 over which a conventional outlet casting 18, leading to the upper end of an associated radiator (not shown) is secured as by screws 20 in a conventional manner. The thermostat structure including features of the present invention includes a sheet metal housing 22 having an outwardly directed flange 24 around its lower margin which is received and clamped between the outlet casting 18 and the cylinder head 12 in accordance with conventional practice, the thermostat structure thus being substantially entirely positioned within the outlet casting 18.

As illustrated best in Fig. 2 the housing 22 is of rectangular section in a horizontal plane but the upper wall is convex as illustrated in Fig. 3. The forward and rearward walls of the housing 22 are each provided with a port 25 therein which ports are round as indicated in Fig. 3 and each is provided with a central bridge 26, curved inwardly of the casing as viewed in Fig. 1 and each of which bridge is centrally apertured as at 28 and preferably axially sleeved or elongated to form a bearing. The housing 22 is exteriorly beaded around each of the ports 25 to form a valve seat 30 and a poppet type valve 32 is arranged for cooperation with each of the seats 30 and its stem 34, which is concentric therewith, is slidably received in the bearing 28 of the corresponding bridge 26. The stems 34 of the valves 32 are hollow and interiorly threaded and received in fixed relation therein are the corresponding bosses 36 formed centrally of the opposite ends of a thermostatic bellows 38. It will be appreciated that the bellows 38 is of the type in which a suitable mass of vaporizable liquid is contained which will vaporize at or about the temperature at which it is desired to have the thermostat open and permit the flow of cooling fluid therethrough. The length of the bellows 38 is such that when it is below its critical temperature axial compression of the bellows urges the valves 32 inwardly toward one another and resiliently holds them against their corresponding valve seats 30.

It will be appreciated from the above that the valves 32 and the bellows 38 form a unitary assemblage which is floatingly supported between the bearings 28 of the bridges 26. Consequently when the bellows 38 contracts to close the valves 32 both valves 32 will be pressed with equal force against their respective seats 30. Likewise when the temperature of the bellows 38 increases beyond its critical point and the bellows expands and moves the valves 32 outwardly away from the corresponding seats 30, the bellows and valves will float as a unit axially thereof under the influence of the static and kinetic pressure of the water flowing through the ports 25 to automatically adjust the valves for equal flow through the corresponding ports.

It will be appreciated from the foregoing that because of the use of the two valves as compared to one used in conventional constructions the valves 32 may be made considerably smaller than conventional valves and likewise they will not be required to lift from their seats to as great an extent as a thermostatic valve of conventional construction of a size to handle the equivalent rate of flow of water therethrough. This permits a bellows 38 of materially smaller diameter to be employed in connection with the construction of the present invention than in a corresponding size of thermostat of conventional construction, the result being that the present invention permits the provision of a thermostat structure of materially smaller size than is possible with conventional constructions. It is thus possible to use smaller outlet castings with the present invention. Furthermore, because of the smaller thermostatic bellows thus capable of being used, it is less sensitive to pressures built up in the system as for instance by means of pressure caps and consequently is of advantage for this reason. At the same time it will be appreciated that the relative proportion of areas of the ends of the bellows 38 to the exposed area of the valves 32 may be arranged to obtain any desired relation with respect to the proportional effect of pressures acting on these faces.

In Fig. 4 a modified form of construction is illustrated but the modification in this instance comprises essentially in replacing the particular type of thermostatic element illustrated in Fig. 3 by a modified form of construction, otherwise the remaining parts are substantially similar to those of the first described construction and consequently a description of the modified form of thermostat will suffice to explain the entire structure. For the purposes of description, therefore, the corresponding parts of Fig. 4 are illustrated by the same numerals as in Figs. 1, 2 and 3 except that such numerals bear a prime mark.

The thermostatic element 38' in Fig. 4, instead of being a true bellows as in Figs. 1, 2 and 3, is what may be termed as a disc type of thermostat which, like the bellows 38, encloses a mass of vaporizable liquid and except for its difference in form functions in identically the same manner as the bellows 38. It is possible to use this type of thermostat shown in Fig. 4 in connection with the present invention for the reason that the axial travel of the valves 32' between closed position and full open position is much less in a thermostat embodying the principles of the present invention than in conventional types of thermostats. It will be observed that the walls of the thermostat 38' are provided with annular corrugations or grooves enhancing its ability to axially expand and contract without unduly stressing the metallic walls thereof.

It might be noted that by the use of the type of thermostat 38' shown in Fig. 4 it is possible to move the valves 32' relatively closer together than is possible where a conventional form of bellows such as illustrated in Figs. 1, 2 and 3 is employed. However, it will be understood that in the broader aspects of the present invention the term "metal bellows" or "metal bellows type of thermostat" is to be interpreted broadly enough to cover either of the types of construction shown in Figs. 1 to 4, inclusive, except in cases where such difference is relied upon as a point of novelty between the two structures there shown.

The structure shown in Figs. 1 to 4, inclusive, makes no provision for by-passing the cooling fluid around the radiator when the fluid is at a temperature insufficient to cause the valves 32 or 32' to open, but provision of such means may be provided in a simple manner as disclosed in Figs 5 and 6. Referring to these figures it will be noted that the construction of Figs. 1, 2 and 3 has been used to illustrate the necessary modifications and, accordingly, identical parts are illustrated by identical numbers and the changed parts only described in detail.

It will be noted that the flange 24 in the construction illustrated in Figs. 1, 2 and 3 is, in the construction illustrated in Figs. 5 and 6, replaced by a flange 24a of smaller outside diameter which is integrally joined around its circumference to an axially and downwardly extending collar or sleeve 40, the collar 40 in turn being provided at its lower edge with a radially outwardly extending flange 42 corresponding in function to the flange 24 first described and adapted to be clamped between the cylinder head 12 and the outlet casting 18a. The outlet casting 18a is provided above its lower face with a radially inwardly extending annular flange 24 integral therewith, of such size as to permit the housing 22 to be projected therethrough but arranged to abut against the upper surface of the flange 24a when the parts are in assembled condition. It will be noted that this arrangement provides for the formation of an annular chamber 46 surrounding the sleeve 40 within the outlet casting 18a. As illustrated in Fig. 6 a tube 48 is projected through the collar 40 so as to open into the chamber 46 and its opposite end is formed into an upwardly opening trough-like structure 50 disposed below the bellows 38 and with its lefthand end, as viewed in Fig. 6, closed. The outlet passage 18a is provided with a passage 52 therein communicating with the chamber 46 and the passage 52 may be connected by a pipe or tube 54 with the inlet side of the water jacket for the cylinder block.

With the above described construction it will be appreciated that when the valves 32 are closed so as to prevent the flow of cooling fluid therethrough, the cooling fluid being delivered to the interior of the housing 22 under pressure will be free to flow downwardly into the trough 50 out through the tube 48 into the passage 46 and then out through the passage 52 and tube 54 to the inlet side of the water jacket for the engine cylinder thereby to be circulated through the engine without passage through the usual radiator. When the temperature of the cooling fluid increases to a sufficient extent to extend the bellows 38 and to open the valves 32, the flow of water through the housing 22 and out through the ports 25 will be under a materially smaller pressure than when the valves 32 are closed and additionally such water in flowing past the upper edges of the trough portion 50 will tend to create a suction in the trough 50 which will offset any tendency of the pressure of the water to circulate through the trough 50 and by-pass the radiator as occurs when the valves 32 are closed. Accordingly, it will be appreciated that this construction provides means for automatically by-passing a desired amount of the cooling fluid around the radiator under those conditions when it is not desired to permit the water to flow through the radiator.

In Figs. 7, 8 and 9 different forms of constructions for by-passing water around the radiator when the main valves of the thermostat structure are closed are illustrated. For the purpose of illustration in these figures the same general form of thermostatic construction illustrated in Figs. 1, 2 and 3 is shown by way of illustration. Accordingly, in the construction illustrated in Figs. 7 and 8 equivalent parts of the construction shown in Fig. 1 are illustrated by the same numerals except that such numerals bear the sub-letter b. It will be noted from an inspection of Figs. 7 and 8 that the only modification is in connection with the change in the housing 22b to provide auxiliary flow ports and the provision of auxiliary valves for cooperation therewith. In other words, in the construction illustrated in Figs. 7 and 8 the upper end of the housing 22b is extended upwardly as compared to the construction shown in Figs. 1, 2 and 3 and is formed to provide flat angular faces 60 on the same side of the housing 22b as those faces thereof in which the ports for the valves 32b are formed. A horizontally directed shoulder 62 is formed on the housing 22b at the lower end of each of the wall sections 60 as shown in Fig. 7 and around the sides as indicated in Fig. 8. Each wall section 60 is provided with a flow port 64 therein and a flat metal valve element 66 is secured to each end of the bellows 38b in a plane parallel to the cooperating wall section 60 and in a position and shaped to cooperate with the corresponding wall 60 to close the port 64 therein when the bellows 38b is in fully expanded condition. Consequently when the bellows 38b is collapsed to move the valves 32b to close their corresponding ports 25b, the valve elements 66 are withdrawn from engagement with their corresponding walls 60 are, therefore, open to the flow of liquid therethrough. It is the flow of liquid through the ports 64 that provides for by-passing the water past the radiator during those periods of operation when the valves 32b are closed.

In order to carry out the last mentioned effect the outlet casting 18b is interiorly provided with a hollow part 68 which extends out through the wall of the outlet casting 18b as indicated in Fig. 8. This part 68 is of sufficient size to receive the upper portion of the housing 22b therein and has an open lower face for receiving such portion and the edges of which abut against the shoulder 62, preferably with the interposition of a gasket such as 70, for sealing such open face to the housing 22b at the shoulder 62. Thus all water which flows through the ports 64 is confined within the part 68. A suitable conduit (not shown) secured to the part 68 exteriorly of the outlet casting 18b is, of course, provided for conducting the water thus discharged into the part 68 to the inlet side of the water jacket for the cylinder block. The angular arrangement of the walls 60 and valve parts 66 insures a good seal between these parts when the bellows 38b is expanded and at the same time positively eliminates any possibility of sticking between these parts. Furthermore, it will be appreciated that because the bellows 38b and the valves 32b form a unit capable of floating axially in the bridges 26b, when the bellows 38b is expanded both valves 66 are pressed with equal force against their corresponding wall 60 to close the ports 64 against the flow of liquid therethrough. This form of construction may be more desirable than illustrated in Figs. 5 and 6 for obtaining the by-pass feature inasmuch as it is positive in its action.

The construction illustrated in Fig. 9 is very similar to that illustrated in Figs. 7 and 8, the main difference being in the manner in which the part within the outlet casting cooperates with the thermostat housing and in the manner in which the by-pass water is discharged from the outlet casting. Accordingly, the parts in Fig. 9 equivalent to those in Figs. 7 and 8 are indicated by the same numerals except that such numerals bear the sub-letter c. In the construction illustrated in Fig. 9 the shoulder 62 of the construction illustrated in Figs. 6, 7 and 8 is eliminated and in its place an outwardly directed flange 76 is provided for cooperating with the lower face of the part 68b, a gasket 78 preferably being provided between the cooperating faces of these parts as illustrated. The above difference is the only change made in the thermostat structure itself. The remaining change is in connection with the part 68c which instead of projecting out through the side of the outlet casting 18b as in the construction illustrated in Figs. 7 and 8, includes a downwardly directed passage 80 which opens upon the lower face of the outlet casting 18c. The cylinder head 12c, and the cylinder block which is not shown in this view, are provided with aligned passages 82 which may lead to the intake side of the water circulation pump or to the inlet side of the water jacket, as desired, for returning the by-passed water to the inlet side of the water jacket without requiring outside connection. Otherwise the construction illustrated in Fig. 9 operates identically to the construction illustrated in Figs. 7 and 8.

Having thus described my invention what I claim by Letters Patent is:

1. In an internal combustion engine of the class having a cylinder head and a water outlet casting removably secured thereto and interiorly provided with a space adapted for connection with the inlet of a radiator, the combination with said cylinder and said water outlet casting of a thermostat structure including a housing received in said outlet casting in spaced relation to the walls thereof, a flange on said housing clamped between said outlet casting and said cylinder head, said housing having a flow port in each of two opposite side walls thereof opening into said space, a valve associated individually with each of said ports, and a single thermostatic element interconnecting said valves.

2. In an internal combustion engine of the class having a cylinder head and a water outlet casting removably secured thereto and interiorly provided with a space adapted for connection with the inlet of a radiator, the combination with said cylinder and said water outlet casting of a thermostat structure including a housing received in said outlet casting in spaced relation to the walls thereof, a flange on said housing clamped between said outlet casting and said cylinder head, said housing having a flow port in each of two opposite side walls thereof opening into said space, a valve associated individually with each of said ports, a single thermostatic element interconnecting said valves, and means supporting said valves and thermostatic element for slidable movement axially of said ports.

3. In an internal combustion engine of the class having a cylinder head and a water outlet casting removably secured thereto and interiorly provided with a space adapted for connection with the inlet of a radiator, the combination with said water outlet casting of a casing interposed in the path of flow therethrough and having side walls inwardly spaced from the inner wall of said casting, two opposed of said side walls each having a port therein aligned with one another and opening into said space, a poppet valve arranged in cooperative individual relationship with each of said ports and arranged to move outwardly to open said ports and inwardly to close said ports, guiding means for slidably supporting each of said valves from said housing, and a single thermostatic element within said housing secured to said valves and free to move axially in said guides therewith.

4. In an internal combustion engine of the class having a cooling liquid circulating system including a water passage, the combination with said water passage of a thermostatic structure including a housing having side walls supported therein with said side walls in spaced relation to the inner walls of said passage, said housing having a pair of aligned ports through opposed side walls thereof communicating the interior of said housing with the space between said housing and the interior walls of said passage, a poppet valve having a head cooperable individually with each of said ports and adapted for movement between the corresponding said side wall and the inner wall of said passage, a single thermostatic element interconnecting said poppet valves, and means for supporting said poppet valves and thermostatic element for floating movement axially of said ports.

5. In an internal combustion engine of the class having a cooling liquid circulating system including a passage adapted to deliver said cooling liquid to a radiator, the combination with said passage of a thermostatic structure interposed in the path of flow of liquid therethrough, said thermostatic structure including a housing supported in said passage and having side walls spaced from the interior walls of said passage, said housing having flow ports in opposed side walls thereof opening into said passage, a poppet valve associated individually with each of said ports and adapted for movement between said side walls and the inner walls of said passage, a single thermostatic element in said housing fixed to both of said valves and slidable axially thereof in said housing as a unit with said valves, and auxiliary means associated with said housing providing means for escape of liquid from said housing independent of said passage when said valves are in closed position.

6. In an internal combustion engine of the class having a cooling liquid circulating system including a passage adapted to deliver said cooling liquid to a radiator, the combination with said passage of a thermostatic structure interposed in the path of flow of liquid therethrough, said thermostatic structure including a housing supported in said passage and having side walls spaced from the interior walls of said passage, said housing having flow ports in opposed side walls thereof opening into said passage, a poppet valve associated individually with each of said ports and adapted for movement between said side walls and the inner walls of said passage, a single thermostatic element in said housing fixed to both of said valves, and auxiliary means associated with said housing providing means for escape of liquid from said housing independent of said passage when said valves are in closed position, said auxiliary means comprising a hollow member carried by said housing and projecting transversely thereof into the path of flow of liquid through said housing and provided with an opening on the downstream side only thereof.

7. In combination, a water outlet casting for an internal combustion engine comprising a hollow body having an outwardly directed flange at one end thereof and an inwardly directed flange interiorly thereof in axially spaced relation with respect to the first mentioned flange, a housing received in said casting, an outwardly directed flange at one end of said housing underlying the first mentioned flange on said casting and a shoulder on said housing abutting the second mentioned flange in said casting whereby to form a chamber between said housing and said casting between said flanges, said housing projecting through the second mentioned flange in said casting with its side walls arranged in spaced relation to the interior walls of said casting and having ports formed in opposite side walls thereof, a valve cooperating individually with each of said ports, a thermostatic element interconnecting said valve, and a trough-shaped member supported by said housing below said thermostatic element and opening towards said thermostatic element and interiorly communicating with said chamber.

8. A thermostat structure comprising, in combination, a housing open at one end thereof and having ports in opposite side walls thereof, a valve positioned with its head exteriorly of said housing arranged in cooperative relation individually with respect to each of said ports, a thermostatic element connecting said valves, and a trough-shaped member extending transversely of said housing below said thermostatic element and with its open sides facing said thermostatic element, said housing having an opening through a wall thereof in communication with the interior of said trough-shaped member.

9. A thermostat structure comprising, in combination, a housing open at one end thereof and having a port in each of two opposed side walls thereof, a poppet valve arranged with its head exteriorly of said housing in cooperative relation individually with respect to each of said ports, a thermostatic element connecting said poppet valves, means for supporting said poppet valves and thermostatic element as a unit for sliding movement axially thereof relative to said housing, said housing having a third port therein, and a valve element carried by said thermostatic element within said housing arranged in cooperative relation with respect to said third port.

10. A thermostat structure comprising a housing open at one end and having a port formed in each of two opposed side walls thereof and an additional pair of ports formed in spaced walls thereof, a valve associated individually with each of the two first mentioned ports, a thermostatic element within said housing connecting said valves for effecting movement thereof with respect to their corresponding ports, and two additional valve elements in said housing arranged in cooperative relationship with respect to said pair of ports and movable by said thermostatic element into cooperative engagement therewith to close the same when said thermostatic element has moved the first mentioned valve to open said two first mentioned ports.

11. A thermostat structure comprising, in combination, a housing open at one end thereof and having a port in each of two opposed side walls thereof, a poppet valve positioned with its head exteriorly of said housing arranged in cooperative relationship individually with respect to each of said ports, a thermostatic element of the metal bellows type interposed between said valves and secured thereto for controlling the movement thereof, said housing having an additional pair of ports therethrough, and a pair of valve elements within said housing fixed for movement with said thermostatic element and arranged in cooperative relationship with respect to said additional pair of ports.

12. In combination, a water outlet casting for an internal combustion engine cooling system, a housing received within said casting in spaced relation to the walls thereof and having an open end sealed to said casting, said housing having ports formed in opposed side walls thereof, a poppet valve arranged with its head exteriorly of said housing in cooperative relation individually with respect to each of said ports, a thermostatic element within said housing interconnecting said valve for effecting movement thereof, said housing having an additional pair of ports formed therein above the first mentioned ports, valve elements within said housing arranged in cooperative relation with respect to the last mentioned ports and operatively connected to said thermostatic element for movement therewith, and an auxiliary flow passage within said casting sealed to said housing between the first mentioned ports and the last mentioned ports whereby to receive the flow of liquid from said housing through said last mentioned ports only.

LAMBERT M. PAYNE.